UNITED STATES PATENT OFFICE.

STUART GWYNN, OF NEW YORK, N. Y.

IMPROVED COATING FOR OIL-VESSELS.

Specification forming part of Letters Patent No. 48,552, dated July 4, 1865.

*To all whom it may concern:*

Be it known that I, STUART GWYNN, of the city, county, and State of New York, have invented a new and useful Method of Coating Oil-Vessels; and I do hereby declare that the following is a full, clear, and exact description thereof.

Vessels of metal, glass, porcelain, and other materials have long been used to contain and transport oils; but these are either too expensive or too fragile to be used economically for storing or transporting the mineral, animal, or vegetable oils in the quantities now produced, and therefore wooden vessels are more generally used, because they are strong, cheap, and easily procured. Wooden vessels are, however, as ordinarily constructed, obnoxious to two serious objections. They either absorb their contents in quantities that make them expensive or they leak and thus occasion large losses from direct waste; and it is the object of my invention to render wooden packages incapable of absorbing their contents, and make them so tight that they cannot leak, and thus wholly prevent waste; and to this end my invention consists in coating wooden or porous packages for oils with an elastic material or compound that shall be insoluble in any of the named oils, or even alcohol.

To the interior of wooden casks or vessels for containing oils I apply a coating of dextrine in solution, and turn the vessel well in all directions to bring the solution in intimate contact with all the parts of the interior of the vessel, when the surplus solution may be poured out; or, instead of dextrine alone, I use with it admixtures of glucose or glycerine in any desired proportions; and it is obvious that the drying of the lining of dextrine or its compounds above named may be accelerated by artificial heat applied in any of the known most judicious modes. When the lining of the casks is sufficiently dry it will be found effectual to prevent waste from absorption or leakage.

What I claim as my invention, and desire to secure by Letters Patent, is—

The new article of manufacture constituting a tight oil-vessel, lined or coated internally, as described.

In testimony whereof I have hereunto subscribed my name.

STUART GWYNN.

Witnesses:
O. HASE,
JOS. I. PEYTON.